United States Patent [19]
Staudacher et al.

[11] Patent Number: 5,657,384
[45] Date of Patent: Aug. 12, 1997

[54] FULL DUPLEX SPEAKERPHONE

[75] Inventors: Daniel W. Staudacher, Denton; Harbhajan S. Virdee, Richardson, both of Tex.

[73] Assignee: Tandy Corporation, Ft. Worth, Tex.

[21] Appl. No.: 401,848

[22] Filed: Mar. 10, 1995

[51] Int. Cl.$^6$ .................................................. H04M 9/08
[52] U.S. Cl. ........................... 379/388; 379/390; 379/411
[58] Field of Search .................................. 379/388, 389, 379/390, 406, 407, 408, 409, 410, 412

[56] References Cited

U.S. PATENT DOCUMENTS

| | | | |
|---|---|---|---|
| 4,922,530 | 5/1990 | Kenney et al. | 379/411 |
| 5,313,498 | 5/1994 | Sano | 379/410 |
| 5,351,291 | 9/1994 | Menez et al. | 379/410 |

OTHER PUBLICATIONS

*DSP Microcomputer,* Analog Devices, Inc., ADSP–2101 (Data Sheet, Rev. A, Undated).
*Cascadable Adaptive Finite Impulse Response Digital Filter (CAFIR);* Motorola, Inc. DSP56200 (Technical Summary BR283, 1986).
*Digital Signal Processing Laboratory Using the ADSP–21–01 Microcomputer,* Chapter 10, pp. 287–291, Vinay K. Ingle and John G. Proakis, Prentice Hall; Copyright 1991, Analog Devices, Inc.

*Full Duplex Speakerphone with Acoustic and Electric Echo–Canceller Utilizing the DSP56200 Cascadable Adaptive FIR Filter Chip,* Sangil Park, Proceedings of Midcon/90 Technical Conference on Electronic and Electrical Technology, Dallas, Texas, Sep. 11–13, 1990.

*Digital Voice Echo Canceller with TMS32020,* David Messerschmitt, David Hedberg, Christopher Cole, Amine Haoui and Peter Winship; Digital Signal Processing Applications with the TMS320 Family, vol. 1, Chapter 15, pp. 417–436, Texas Instruments, 1986 (Reprinted 1989).

*The TMS320 Family of Digital Signal Processors,* Kun-Shan Lin, Gene A. Frantz, and Ray Simar, Jr., Proceedings of the IEEE, vol. 75, No. 9, pp. 1143–1159, Sep. 1987; Reprinted 1989, pp. 26–28.

*Primary Examiner*—Ahmad F. Matar
*Assistant Examiner*—Jacques M. Saint-Surin

[57] ABSTRACT

A full duplex speakerphone for connection to a telephone system employs adaptive FIR filters for acoustic and electrical echo cancellation in a novel combination with analog gain controls responsive to incoming signal levels and a transmit level control responsive to the receive signal power level. The particular combination minimizes the amount of digital signal processing required to maintain full duplex operation by holding the signal dynamic range within predetermined limits.

30 Claims, 5 Drawing Sheets

| MUX CONTROL | | |
|---|---|---|
| IN-1 | IN-2 | OUT |
| 0 | 0 | C |
| 0 | 1 | B |
| 1 | 1 | A |
| 1 | 0 | * |

* NOT POSSIBLE

FIG. 7c $t_2 = t_1 + 50$ mSEC    $t_3 = t_1 + 135$ mSEC

FULL DUPLEX SPEAKERPHONE

FIELD OF THE INVENTION

This invention relates generally to telephone equipment and, in particular, to hands-free telephones which operate in the full duplex mode of operation.

BACKGROUND OF THE INVENTION

One of the most popular pieces of telephone equipment presently on the market is the speakerphone, a device which allows hands-free operation by utilizing a microphone and a loudspeaker to receive and transmit voice information or other sounds. Although speakerphones have been in existence for many years, they typically suffer from certain drawbacks which often make their use difficult or inconvenient. More particularly, because its microphone and loudspeaker are located in close physical proximity (often together in a small unit), the speakerphone is highly susceptible to interference from echoes caused by sounds generated by the loudspeaker and received by the nearby microphone and other noise generated by both acoustic and electrical sources. In addition, speakerphone systems are susceptible to electrical echoes. An electrical echo is generated when a portion of the electrical signal which represents the acoustical information is "reflected" as the signal travels along the electrical circuit and the reflected portion of the signal travels back to its source.

Acoustic echoes occur because sounds generated by the loudspeaker are detected by the microphone and transmitted back over the telephone line. The sounds generated by the speaker reach the microphone either directly or by reflections from the walls of the room in which the phone is located. One method of eliminating acoustic echoes is to utilize a "half-duplex" system in which either the speaker or the microphone is active, but both devices are not active at the same time. In such an arrangement, a circuit monitors the microphone output and turns off the speaker for a predetermined period of time when the microphone has detected a sound. Similarly, if the speaker is active, the microphone is disabled for a predetermined period of time.

Half duplex systems suffer from a problem that only one person of a two-person conversation can speak at any given time and, even then, the first syllable or two of speech is often "clipped" or lost due to the "dead" time interval that occurs when the microphone switches from the inactive state to the active state. When a half-duplex speakerphone is connected to a conventional handset phone, the clipping problem is acceptable, but when two such speakerphones are connected together, it is often very difficult to converse without losing a significant amount of information. In order to overcome the problems associated with half-duplex speakerphones, "full-duplex" speakerphones have been used in which both the microphone and the speaker are operational at all times, but such systems are extremely susceptible to acoustic echoes.

Figure 1:
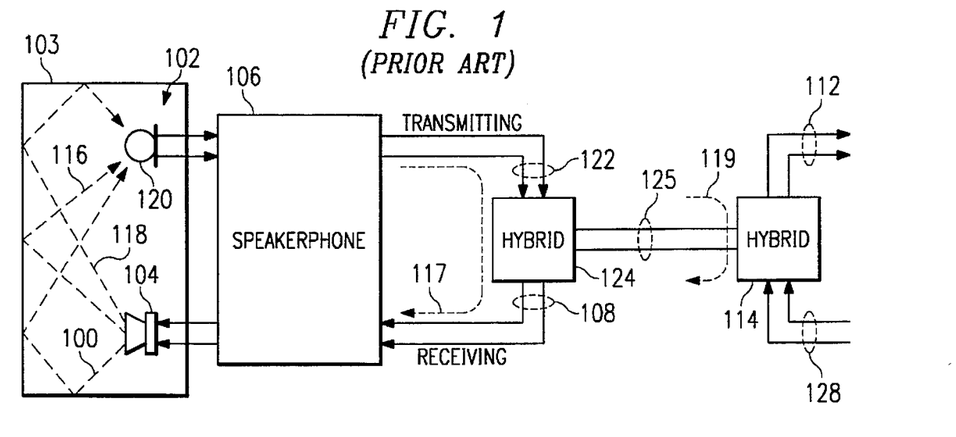
FIG. 1 is a functional block diagram of a prior art speaker phone system.

FIG. 1 is a block diagram for illustrating how acoustic and electrical echoes are generated in a speakerphone system. In particular, FIG. 1 shows a representation of a speakerphone consisting of a speaker 104 and a microphone 120 connected to speakerphone circuitry 106. The speaker 104 and the microphone 120 are located in a room 102 and the speakerphone circuit 106 is, in turn, connected by means of a two-wire receiving leg 108 and a two-wire transmitting leg 122 to a hybrid circuit 124. The hybrid circuit 124 converts the four-wire circuit, comprising legs 108 and 122, to a two-wire line 125. At the other end of the telephone line, a similar hybrid circuit 114 converts the two-wire line 125 back into a four-wire circuit comprising a receiving leg 112 and a transmitting leg 128.

An acoustic echo is generated when a sound emanating from the speaker 104 is transmitted into the microphone 120, for example, by reflection from the room walls 103, and is heard by a person at the other end of the phone line 125. Since there are typically a variety of paths by which a sound generated by speaker 104 can reach microphone 120, many acoustic echoes can be generated from the same initial sound. Three such echo paths (paths 100, 116 and 118) are illustrated in FIG. 1. The echoes are annoying to the person at the far end.

As previously mentioned, an electrical echo is generated in the speakerphone system when a portion of the electrical signal transmitted from the near end is reflected back to the source by impedance discontinuities in the electrical circuit, for example at the 4 wire/2 wire hybrid transformers. In FIG. 1 these electrical echoes are represented by signal reflection 117 from the near-end hybrid 124 and signal reflection 119 from the far end hybrid 114.

Acoustic and electrical echoes are particularly annoying when two persons are conversing over speakerphones because the echoes from a previously uttered phrase often arrive as the person has begun speaking a new phrase. Consequently, in some speakerphone systems, and, in particular, full-duplex speakerphone systems, adaptive filters are used to reduce the echoes to an acceptable level.

For example, at the near end, the signal reaching the loudspeaker is also applied to an adaptive filter whose output is subtracted from the electrical output of the microphone. The filter adjusts automatically to provide a transfer function nearly identical with that of the path through the loudspeaker and microphone by way of the acoustical coupling between those components. The subtractive process thus eliminates, or greatly reduces, the acoustic feedback signal in the microphone output. The same arrangement is used to cancel electrical echoes by applying the incoming electrical signal generated by the far end microphone to a second adaptive filter whose output is subtracted from the signal going out to the near end loudspeaker. A typical adaptive filter used in speakerphone systems is called an adaptive finite-impulse-response (AFIR) filter which is comprised of a tapped delay line that generates signals that are selectively combined to generate the filter output. Adaptive FIR filters may be conveniently implemented using digital signal processor (DSP) integrated circuits or "chips".

Figure 2:
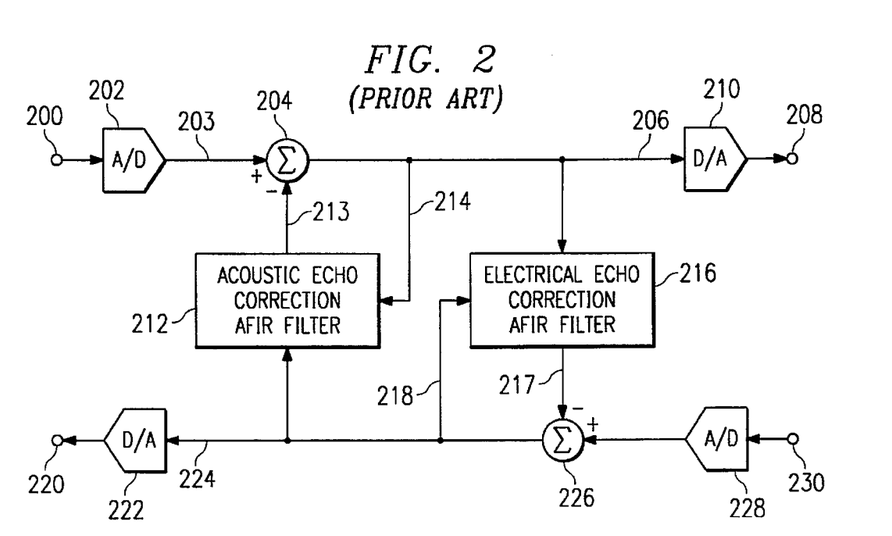
FIG. 2 is a functional block diagram of a portion of a prior art phone circuit illustrating the use of AFIR filters for acoustic and electrical echo cancellers.

FIG. 2 shows the digital section circuitry in an illustrative speakerphone employing DSP chips corresponding to a portion of speakerphone circuitry 106 in FIG. 1. Two digital AFIR filters are used in the digital section to cancel both acoustic and electrical echoes. In the illustrated circuit, AFIR filter 212 is used for correcting or cancelling acoustic echoes and AFIR filter 216 is used for correcting or cancelling electrical echoes. The microphone input 200 is provided to an analog-to-digital (A/D) converter 202 where it is sampled at the Nyquist rate (twice the highest signal frequency) to generate a plurality of digital samples over time. These samples are provided to a summer 204 where the correction signal output 213 of the AFIR filter 212 is subtracted from the output 203 of A/D 202 to generate the echo-corrected signal. This latter signal is provided over bus 206 to digital-to-analog (D/A) converter 210 and reconverted back to analog form for transmission over the telephone lines attached to line output 208. An error signal, derived from the corrected signal, is also fed back to the AFIR filter 212, via bus 214, in order to adaptively adjust the filter coefficients in a known manner to cause the filter to adapt to changes in the echo generating mechanisms as discussed above.

In a similar manner, signals received at the line receive input 230 are provided to an A/D converter 228 for conversion into digital form. The digital signals are, in turn, provided to a summer 226 which subtracts the correction signals 217 generated by electrical echo corrector filter 216 from the output of A/D 228. The digital output samples to drive the loudspeaker output are converted to analog signals using D/A converter 222. The corrected signal is also fed back to AFIR filter 216 via bus 218 in order to adaptively adjust the filter coefficients as explained above for AFIR filter 212.

More specifically, a typical finite-impulse-response (FIR) filter is a linear filter, preferably in the form of a tapped delay line. Each tap has associated with it a "weight" which modifies the characteristic of the filter. If the delay line has only feed-forward delays, its transfer function can be expressed as a single polynomial in $Z^{-1}$ and the filter's impulse response is limited to a finite number of points; therefore, it has a finite impulse response.

Figure 3:
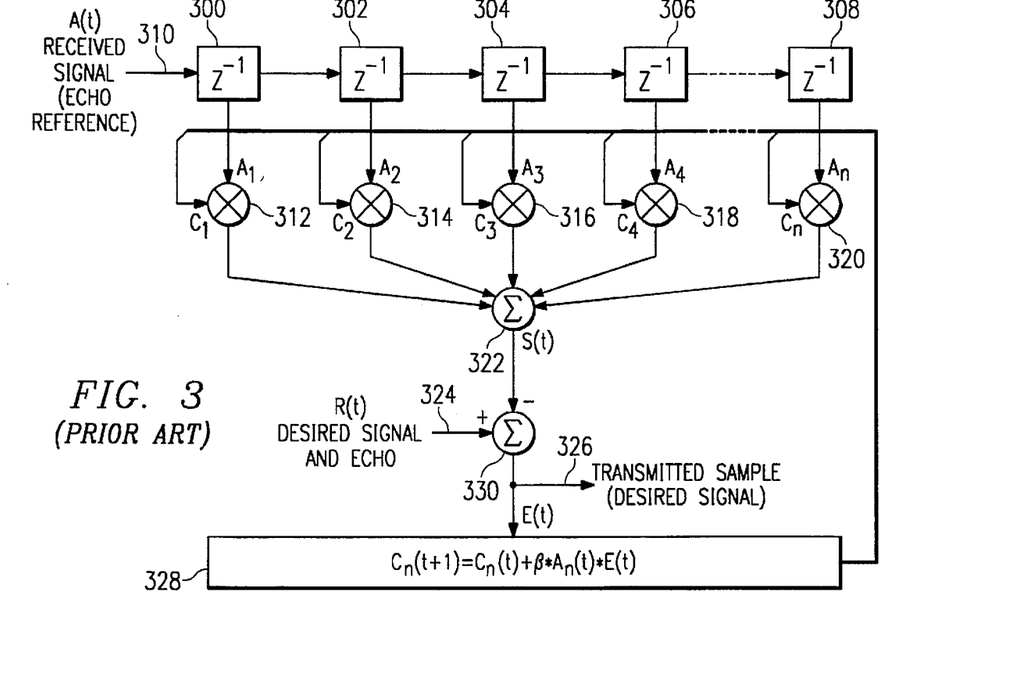
FIG. 3 is a block diagram of a prior art adaptive finite impulse response (AFIR) filter illustrating the tapped delay line construction.

An adaptive finite impulse response (AFIR) filter is a FIR filter with provision for automatic adjustment of its tap weights. FIG. 3 shows an AFIR filter wherein a least-mean-squared (LMS) algorithm adapts the tap weights of the filter used in this example as an echo canceller. A plurality of received digital signal samples, A(t), which are typically samples derived from an analog signal sampled at, or above, the Nyquist rate, is introduced to the filter at the input 310. This signal is used as a reference signal to develop an estimate of the echo to be canceled and the signal is applied to successive delay units 300, 302, etc., until the "end" of the filter at delay unit 308 is reached.

Each of the delays 300, 302, 304, 306, 308 and any additional (but not illustrated) delays, produces a delayed version of the signal and then passes that signal to the next delay unit. The delayed versions of the signal (illustrated as signals $A_1, A_2, \ldots, A_N$) are also fed to multipliers 312, 314, 316, 318, through 320 where they are multiplied by associated tap weights $C_1, C_2, \ldots, C_N$. The multiplier outputs are fed into summer 322 where they are added to produce, in the case of an echo cancellation application, the filter output which is an estimate S(t) of the echo.

The echo estimate, S(t), is subtracted in the summing block or adder 330 from the signal R(t), which is the desired (echo-free) signal corrupted by the echo. The output of adder 330, E(t), is used as an estimate of the desired signal 326 and comprises the actual desired signal plus whatever residual error exists between the estimate of the echo S(t), and the actual echo signal.

The desired signal estimate E(t) is also used to modify the tap weights, that is, adapt the FIR filter, generally by means of an algorithm as shown at 328. The particular algorithm illustrated in box 328 is a least mean squares (LMS) algorithm which computes the tap weight for a given sample $C_n(t+1)$ using the tap weight used with the previous sample $C_n(t)$ plus a correction factor which consists of the product of a convergence constant ($\beta$), the delayed signal from the previous sample ($A_n(t)$) and the estimated signal from the previous sample time (E(t)). This adaptation reduces the signal error attributable to echoes and adjusts to changing conditions which modify the echo characteristics.

Figure 4:
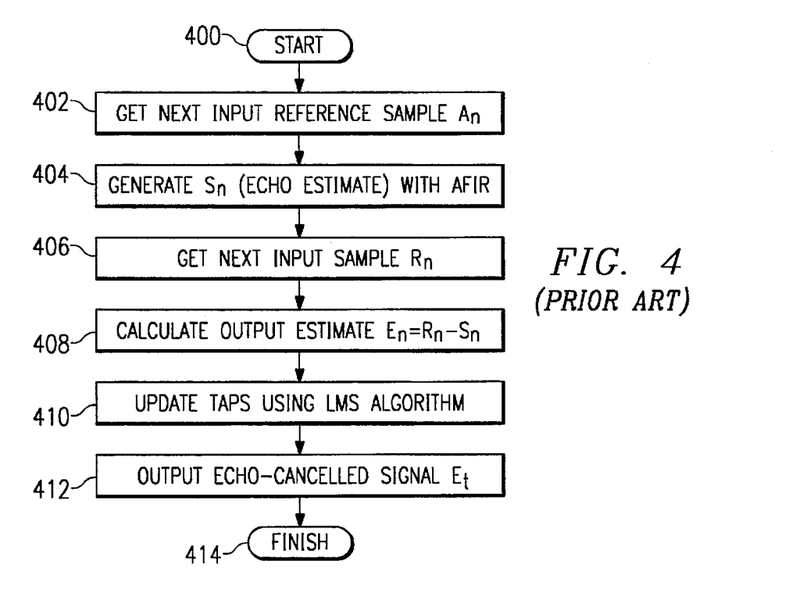
FIG. 4 is a flow chart which sets forth the operation of an adaptive process used to update the filter coefficients of a prior art AFIR filter.

FIG. 4 shows an illustrative flow chart for operating an AFIR filter such as that shown in FIG. 3. The process begins at step 400 and proceeds to step 402 where the next sample, corresponding to a sampled version of a reference signal 310 of FIG. 3, is retrieved. Then an echo estimate is generated at step 404 using an AFIR filter. An input sample, corresponding to the desired output sample plus an echo contribution is then retrieved at step 406. The output estimate is calculated at step 408 and is used at step 410 to update the tap weights ($C_n$) associated with the AFIR filter. At step 412, the echo-canceled signal, E(t), is output. At this point, the routine is complete, as illustrated by step 414.

The invention disclosed herein implements a full duplex speakerphone using a form of adaptive filtering similar to application Ser. No. 08/190,775, entitled ECHO CANCELLATION APPARATUS, now U.S. Pat. No. 5,473,686 issued Dec. 5, 1995 and assigned to Assignee of the present invention and issued on Dec. 5, 1995 as U.S. Pat. No. 5,473,686. That application disclosed a technique for adapting the length of a tapped delay line to particular conditions which affect the amount of delay necessary to provide optimum echo cancellation in a full duplex speakerphone. The present invention employs tapped delay lines having a fixed number of taps which use techniques for controlling signal levels to achieve effective echo cancellation.

AFIR filters can be used as illustrated in FIGS. 2 and 3 to reduce both acoustic and electrical echoes in speakerphones. However, in order to provide these benefits in a low-cost full duplex speakerphone, careful attention to the architecture of the circuitry, several inherent characteristics of full duplex speakerphones, and drawbacks of the prior art is necessary.

In the prior art, each AFIR filter is typically implemented using an individual DSP or several DSP chips connected in cascade. In addition, a control DSP or microprocessor is required to perform the adaptive coefficient computations and control operations of the entire circuit. As many as three to five DSP chips may be required, making this technology available in products to consumers for home or small business use only at relatively high cost.

Full duplex speakerphones enable users at both ends of the communications channel to talk at the same time. This situation, known as doubletalk, can create ambiguous conditions in the AFIR due to the uncorrelated signal components which may exist at any particular time among the two uncorrelated signals. AFIR filter systems may converge on the wrong signal and fail to suppress the target echo or it may not succeed in converging at all, leading to undesirable effects such as howling or squealing. Prior art solutions employ double-talk detectors to detect the condition and suspend the computation of adaptive coefficients while double talk occurs. One effect of suspending AFIR filter coefficient computations is that sufficient echo cancellation occurs for only one condition and compromises all others, resulting in perceptible echo variations that are distracting to the user. This is especially significant for an acoustic echo cancellation filter which must operate over a wide range of reflective conditions in the acoustic environment.

The limited dynamic range or signal-to-noise ratio (S/N) of a telephone product and its typical environment, approximately 30 dB, poses few signal-handling problems to the designer. However, excessive signal levels can cause poor audible performance from a DSP-based system. The 30 dB dynamic range requires that the echoes be suppressed by the AFIR filters to the level of the background noise set by system parameters, level of distortion products, etc. If the maximum signal level is not constrained, the echoes suppressed by 30 dB will be above the noise level and thus audible. This problem can become obtrusive if left uncorrected and must be solved by inexpensive means in a low-cost consumer product.

A further problem that can arise when signal levels become excessive is caused by severe distortion that results when the A/D converters attempt to encode excessive incoming signals driven into the clipping region of the amplifiers by loud voices or other loud sounds during telephone conversations. Such peak amplitude clipping generates distortion products in the form of undesirable harmonic spectral components. More importantly, a clipped signal is seen by the AFIR filter as a smaller peak amplitude signal than is really present. The resulting echo suppression, being disproportionately small, allows some echo components to pass through the system without suppression. The result is ringing or howling sounds which are extremely disrupting to communications.

SUMMARY OF THE INVENTION

The foregoing problems are solved and a technical advance is achieved by method and apparatus for implementing full duplex operation in a low-cost consumer speakerphone that provides perceptibly complete suppression of all the undesirable artifacts of full duplex operation due to signal reflections and delays in the signal paths. In a departure from the art, control of the signal amplitudes with a novel combination of automatic gain control and signal attenuation enable full suppression of both acoustic and electrical echoes using only two adaptive FIR filters.

More particularly, a full duplex speakerphone having a microphone connected to the transmit signal output and a loudspeaker connected to the receive signal input is disclosed. The transmit output and receive input, which may be coupled to a telephone line through a hybrid, are coupled to a first adaptive finite impulse response (FIR) filter for cancelling acoustic echoes arising in the acoustic path between said loudspeaker and said microphone and a second adaptive FIR filter for cancelling electrical echoes arising in the electrical path between the transmit output and the receive input. Analog gain control amplifiers for limiting the amplitude of the signals from the microphone and from the receive inputs and a transmit level control for regulating the attenuation of the transmit signal in response to the signal power level of the receive input are also provided. In the illustrative embodiment, the adaptive filters are implemented using digital signal processing circuitry which provides the tapped delay lines, means for calculating the tap weighting coefficients, and the host processor control functions. The transmit level control may also be provided by the host processor.

BRIEF DESCRIPTION OF THE DRAWINGS

For a fuller understanding of the nature of the invention, reference should be made to the following detailed description taken in connection with the accompanying drawings, in which:

FIG. 5b shows the digital processing section of the full duplex speakerphone of FIG. 5a.

FIG. 6a is a circuit schematic diagram of the analog gain control (AGC) used in the full duplex speakerphone illustrated in FIG. 5a.

FIG. 6b shows the gain control characteristic of the analog gain control (AGC) of FIG. 6a.

FIG. 7b shows a truth table for the multiplexer portion of the Transmit Level Control (TxLC) of FIG. 7a.

FIG. 7c shows the attenuation characteristic of the Transmit Level Control (TxLC) of FIG. 7a.

DESCRIPTION OF THE PREFERRED EMBODIMENT

Figure 5A:
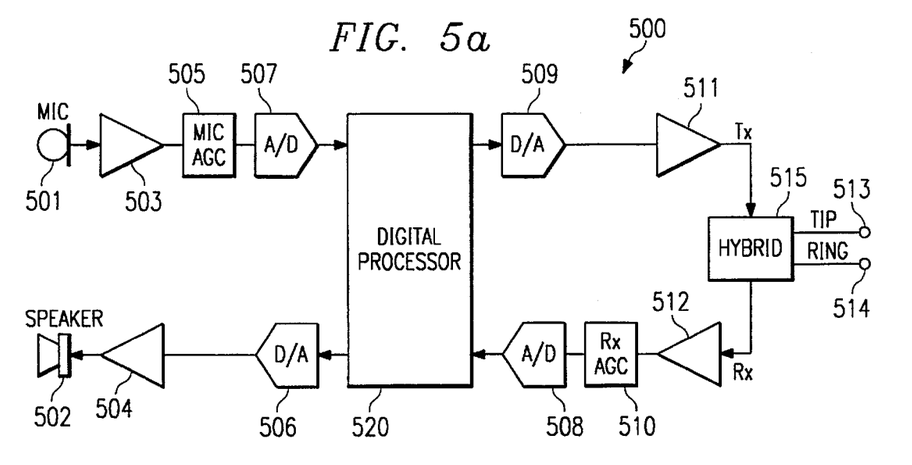
FIG. 5a is a functional block diagram of a full duplex speakerphone that embodies the invention.

In FIG. 5a reference numeral 500 refers to a full duplex speakerphone embodying principles of the present invention. All of the structure shown may be contained in a single housing, placed in a room for use, and connected to the telephone line (not shown) via the Tip 513 and Ring 514 terminals. Sounds in the room are detected by microphone 501 and amplified by microphone amplifier 503. The amplified microphone signal is further processed in the microphone analog gain control (AGC) 505 before undergoing conversion to digital form in analog-to-digital (A/D) converter 507. The digital microphone signal is processed by functions to be described later in digital processor 520 before being converted back into analog form by digital-to-analog (D/A) converter 509. The analog output signal of D/A 509 is amplified by transmit amplifier 511 and passes to the Tip 513 and Ring 514 terminals via hybrid 515. Hybrid 515 couples the transmit (Tx) and receive (Rx) signals to the telephone line and isolates them from each other. The hybrid 515 also enables a predetermined amount of sidetone component of the transmit signal to appear in the receive signal path.

Signals received from the telephone at Tip 513 and Ring 514 terminals are coupled by hybrid 515 to the receive amplifier 512. The amplified receive signal is further processed in the receive analog gain control (AGC) 510 before undergoing conversion to digital form in A/D converter 508. The digital receive signal is processed by functions to be described later in digital processor 520 before being converted back into analog form by D/A converter 506. The analog output signal of D/A 506 is amplified by power amplifier 504 to drive the loudspeaker 502 which produces the sound of the received voice signal in the room where the speakerphone 500 is located.

Figure 5B:
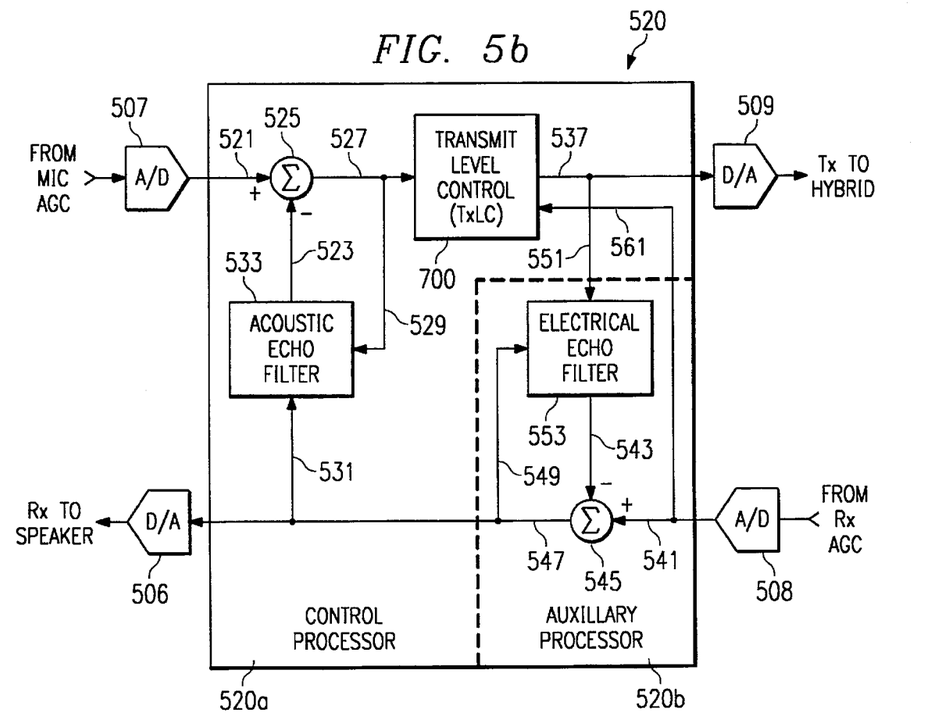

In FIG. 5a, digital processor 520 applies digital signal processing techniques to the voice signal apparatus to enable full duplex communication to occur without allowing echoes and feedback artifacts to disrupt the conversation. In general, digital signal processing performs mathematical operations upon the series of discrete digital numbers representing the original continuous input signal to accomplish desired functions such as filtering, modulation, or detection through various combinations of delay, multiplier, and adder stages. In the full duplex speakerphone 500, digital processor 520 provides adaptive filtering of both the microphone signal and the receive signal to remove echoes that may occur during operation. The microphone AGC 505 and the receive AGC 510 prevent excessive input signals from reaching the converter inputs. Additionally, digital processor 520 includes a transmit level control (TxLC) 700, as shown in FIG. 5b, to further control echo levels in the speakerphone 500. Together, this novel combination of elements efficiently suppresses both acoustic and electrical echoes arising in the system during use.

Turning specifically to FIG. 5b, each element of the digital processor 520 will be described. The incoming signal from the speakerphone microphone (MIC) (501 in FIG. 5a) and the signal received from the far-end telephone (Rx) via the tip and ring (513 and 514 respectively, in FIG. 5a) are processed in the respective AGC blocks (505 and 510 in FIG. 5a) before being applied to the microphone A/D converter 507 and the Rx A/D converter 508, respectively, shown in FIG. 5b. The AGC blocks 505 and 510 will be described in detail later.

The incoming analog MIC and Rx signals in FIG. 5b are sampled at approximately 8 KHZ and encoded into 16 bit binary words by the A/D converters 507 and 508. Similarly, the 16 bit binary words output from a control processor portion 520a are decoded and interpolated in the digital-to-analog converters 506 and 509 to restore the filtered and processed signals to analog form to drive the speaker amplifier (504 in FIG. 5a). In the preferred embodiment, all the A/D 507, 508 and D/A 506, 509 converters may be conveniently contained in a single integrated circuit, for example type ASCO 2300 Audio Stereo Codec manufacturedby ITT Semiconductors. This particular codec also contains a built-in serial interface for coupling and exchanging all of the digital data and control signals with the control processor portion 520a and an auxiliary processor portion 520b. While these signal paths are shown functionally as the separate signal paths MIC input 521, Rx input 541, Tx output 537, and corrected RX signal 547, in the actual circuit, these signals travel in digitally encoded form along a serial interface bus between the codec and the control and auxiliary processors 520a and 520b. Though not shown in FIG. 5b, this use of a serial interface bus is well known and understood in the art.

Attention is now addressed to the control processor 520a and auxiliary processor 520b comprising the digital processor 520 section in FIG. 5b. Each processor portion implements an adaptive finite impulse response (AFIR) filter to perform its respective echo-cancelling filter function. Each AFIR filter operates as described in conjunction with FIGS. 2, 3, and 4 previously discussed in Background of the Invention. In the preferred embodiment, the control processor 520a implements the acoustic echo filter 533 with a 400-tap AFIR filter that provides delays up to 50 milliseconds for cancelling acoustic echoes. The control processor 520a used in this particular embodiment is capable of 512 taps providing up to 64 milliseconds delay at an 8 KHZ sampling rate. Fifty milliseconds of delay is sufficient to estimate the echo path for typical rooms found in office environments. The echo path varies with the dimensions of the room and the sound-reflective characteristics of the room surfaces. Similarly, the auxiliary processor 520b implements the electrical echo filter 553 with a 143-tap AFIR filter that provides a delay of approximately 17.9 milliseconds for canceling electrical echoes caused by impedance discontinuities in the 4-wire/2-wire hybrids. In this particular embodiment 143 taps was found to be optimal for all representative conditions using an 8.0 KHZ sampling rate at 8 bits per sample. The actual number in a given application will typically trade off (a) the minimum delay required to adapt the coefficients with (b) sufficient delay required for the filter to estimate the signal path delay for all expected variations in line impedance due to hybrid discontinuities and length variations. Due to the much higher propagation velocity of electrical signals in conducting circuits, less delay and fewer taps are required to estimate the electrical echo path than in the case for acoustic echoes.

The auxiliary processor 520b has no other tasks to perform other than the electrical echo filter 553 and is conveniently implemented in the preferred embodiment by a type DSP56200 AFIR Digital Filter manufactured by Motorola, Inc. This device is a DSP chip dedicated to AFIR filter applications which computes the filter tap coefficients using the least-mean-squares (LMS) algorithm and is capable of implementing AFIR filters of up to 256 taps at a sampling rate of 19 KHZ. Thus, the requirement of 143 taps at a sampling rate of approximately 8 KHZ for the preferred embodiment of the present invention is easily met.

In contrast, the control processor 520a provides all the control functions of the host processor in a microcomputer-based product in addition to the acoustic echo filter 533, including the computation of the 400 tap coefficients at each sampling interval and the transmit level control (TxLC) 700 described in detail below. These tasks are accomplished in the preferred embodiment using a type ADSP-2105 DSP microcomputer manufactured by Analog Devices. This device, which combines a serial port with a complete DSP microcomputer having sufficient on-chip data memory to enable computation of the 16 bit adaptive coefficients needed to implement acoustic echo filter 533. The ADSP-2105 also has 1K words (4K bytes) of volatile on-chip program memory that requires use of an external boot ROM. Upon power-up, the processor loads the program from the boot ROM into on-chip RAM thus maximizing the run-speed by eliminating external memory accesses. This particular partitioning of filter and control functions in the digital processor 520 enables the use of only two low-cost, off-the-shelf DSP devices for implementing full duplex capability in a consumer level product.

Continuing with FIG. 5b, the internal structure of the acoustic echo filter 533 and the electrical echo filter 553 closely resembles the AFIR illustrated in FIG. 3 and previously discussed in detail. Briefly, the acoustic echo filter 533 subtracts the echo estimate of the acoustic path between the loudspeaker 502 (FIG. 5a) and microphone 501 (FIG. 5a), obtained by delaying the corrected Rx signal 547 through path 531 to the tapped delay line within acoustic filter 533, from the received microphone signal 521 in summing block 525 to produce a corrected microphone signal 527. This corrected microphone signal 527 contains little or none of the acoustic echo and is fed back to the acoustic echo filter 533 as an error signal 529 to be used to adapt the filter coefficients in the direction necessary to minimize the echo content of the corrected microphone signal 527. The corrected microphone signal 527 is also fed to the output of the control processor section 520a as the transmit Tx signal 537 fed to D/A 509 after passing it through the transmit level control 700.

In a similar manner, the electrical echo filter 553 subtracts the echo estimate of the electrical paths between the Tx signal 537 output and Rx signal 541 input, obtained by delaying the Tx signal 537 through path 551 to the tapped delay line within electrical echo filter 553, from the received Rx signal 541 in summing block 545 to produce a corrected Rx signal 547. This corrected Rx signal 547 contains little or none of the electrical echo produced by the hybrid circuit impedance discontinuities and is fed back to the electrical echo filter 553 as an error signal 549 to be used to adapt the filter coefficients in the direction necessary to minimize the echo content of the corrected Rx signal 547. The corrected Rx signal 547 is also fed to the control processor section 520a where it is applied along signal path 531 to the acoustic echo filter 533. The corrected Rx signal 547 is also passed through the control processor 520a to the D/A converter 506.

It was pointed out previously that the dynamic range of signal levels in typical voice communications over standard telephone lines connected to a speakerphone product is about 30 dB, the difference between the loudest signal on the telephone line and the background noise level in a typical office environment. Thus, the amount of echo suppression required from the adaptive filters must be sufficient to suppress the echo components to the background noise level to prevent the build-up of any interfering narrowband signal such as howling or to reduce distracting echo components to inaudibility. Since the background noise level tends to be relatively stable in a given system, some means must be provided to prevent excessive signal levels in the system, particularly at the reference input terminals to the AFIR sections represented by signal paths 531 and 551 to acoustic echo filter 533 and electrical echo filter 553, respectively. Without means to control the signal levels, the suppressed echo of an excessive signal may be greater than the noise level and thus manifest itself as an impairment to the communication or as a trigger for more severe narrowband interference.

A further reason to ensure suppression of echo components down to the noise level is to prevent the existence of extra signals to which the filters would attempt to converge during the adaptive processing. This situation most often occurs during periods of double-talk, when both the near-end and far-end talkers are speaking at the same time. Double-talk produces strong uncorrelated signals at the reference and error inputs to the adaptive filters which can result in divergence of the filters because the error inputs to the filters contain both an echo-corrected signal of one end and the strong, uncorrelated input signal of the opposite end. The resulting adaptation of the filter coefficients to the ambiguous error signal impairs the echo cancellation process.

One recognized solution to the double-talk problem is to suspend the adaptive computation process during the time double-talk is present, in response to a detector which yields an output whenever both reference inputs experience an input signal uncorrelated with the other. While this inhibits divergence, it also inhibits the echo cancellation functions and impairment to the conversations can result.

A better solution provided by the present invention is to avoid suspending the adaptive computation of the AFIR filters and instead control the signal levels on one or both filter reference input lines so that continuing adaptation tends to remain "locked-on" to the correct error signal. A surprising result of experimentation showed that controlling the far-end talker's signal, the output of receive amplifier 512 in FIG. 5a, had a greater beneficial effect since it is the reference input for the AFIR filter providing the longest delay and hence the greatest disruption to intelligibility if its echo cancellation became disabled.

Figure 7A:
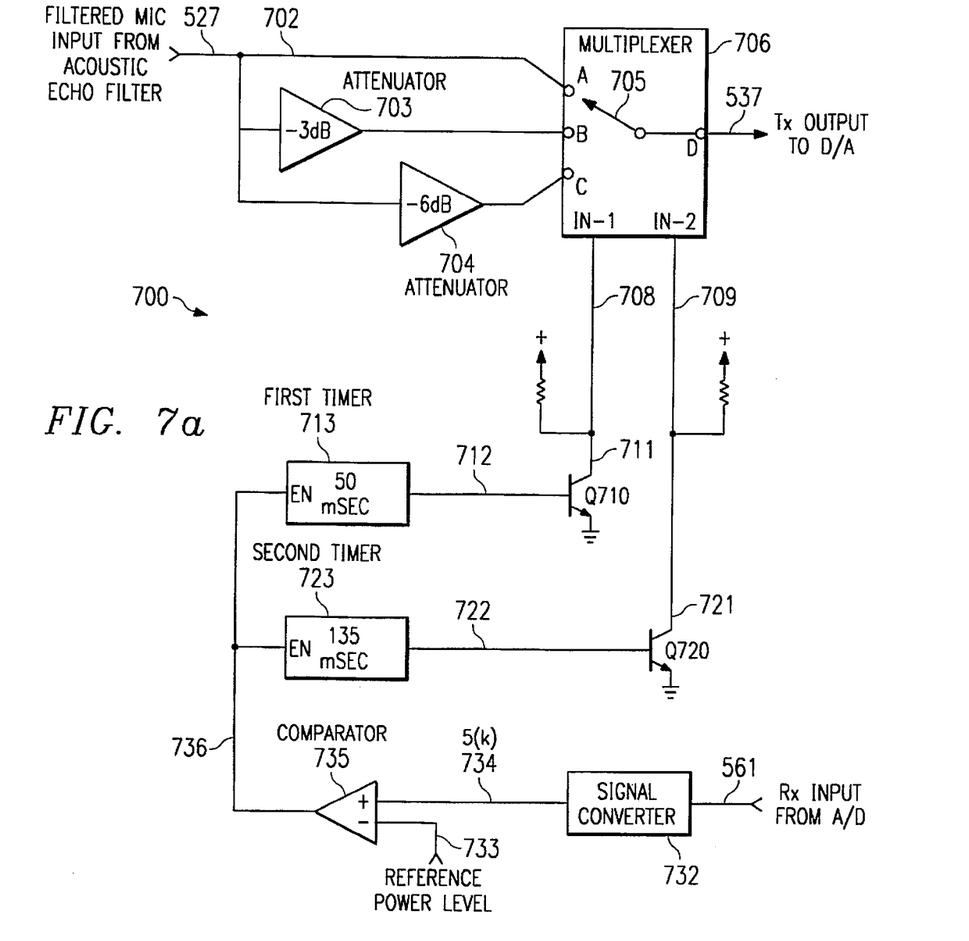
FIG. 7a is a functional block diagram of the Transmit Level Control (TxLC) used in the full duplex speakerphone illustrated in FIGS. 5a and 5b.

Further experimentation with these effects showed that a transmit level control (TxLC) 700 placed in the Tx signal path 527 responsive to the signal level at the Rx signal 541 is capable of minimizing the effects of double-talk and of maintaining the required 30 dB dynamic range in the system. Briefly, the TxLC 700 is an attenuator that operates on the digital Tx signal 527 with a fast-attack, slow-release characteristic. The incoming Rx signal 541 is fed to the TxLC 700, via path 561, wherein its power level is compared with an experimentally predetermined reference power. Upon exceeding the reference level, the output of the comparator initiates an immediate 6 dB attenuation which is maintained until the input level at 561 drops below the predetermined reference. Thereafter the attenuation is reduced in two 3 dB steps under timer control to restore the system to an unattenuated condition. The timing characteristics are set to enable system stability for excessive received signals of both transient and sustained duration. The TxLC means will be described in greater detail in the description of FIG. 7.

Another important source of signal-level effects which can impair the performance of the digital processor 520 shown in FIG. 5b occurs if the signals arriving at the inputs to the A/D converter 507 or A/D converter 508 are clipped. Peak amplitude clipping is a form of distortion that reduces actual peak values and adds substantial harmonic spectral content to the signal. Amplitude clipping typically appears in the output of an amplifier stage when the input amplitude is excessive. The result is that echoes present in the signal to be corrected are incompletely suppressed because significant echo-component energy resides in the desired-signal harmonics. These desired signal harmonics tend to occur frequently within the peak excursions of the signal and are lost when the peak excursions are clipped. Thus, with clipping, the AFIR filters 533 and 553 would suppress echoes in a signal which is both reduced in peak value and which is missing some of the signal spectral content resulting in inaccurate suppression due to impaired convergence and adaption of the filter coefficients.

The effect of harmonic distortion due to peak amplitude clipping in and of itself is often a harsher-sounding signal. More importantly, the echoes being "subtracted" in the summing blocks 525 and 545 would be subtracted from different signals than were present as reference inputs to the AFIR filter blocks 533 and 553 on paths 531 and 551, respectively. Hence, with clipping, incomplete echo suppression would result. The result would be undesired signal artifacts which degrade intelligibility or worse, lead to howling or other regenerative effects.

Figure 6A:
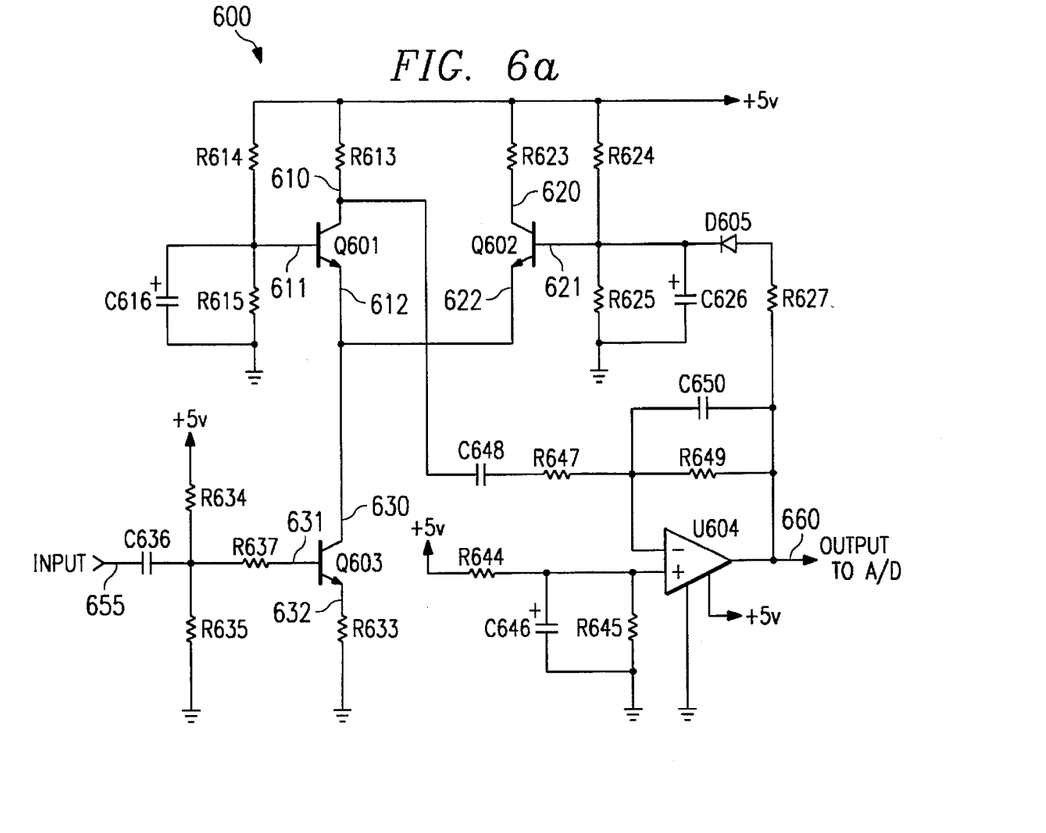

Experimentation demonstrated the use of the analog gain control stages 505 and 510 shown in FIG. 5a to be very effective in preventing clipped signals from reaching the inputs to A/D converters 507 and 508. These stages form part of the preferred embodiment as necessary adjunct functions to the digital processor 520 shown in FIG. 5b. As used in the two locations in the actual product, the particular circuit values of certain components will vary because the signal characteristics from the microphone 501 (FIG. 5a) and the received Rx signal at amplifier 512 (FIG. 5a) will in general be different. Otherwise, the analog gain control circuits 505 and 510 may be identical. The circuit shown in FIG. 6 was chosen among several alternatives for use in the preferred embodiment.

Referring to FIG. 6a, transistors Q601 and Q602 are a matched pair of NPN transistors with emitter terminals 612 and 622 connected together to the collector terminal 630 of NPN transistor Q603. Transistors Q601, Q602, and Q603 together comprise a variable gain control amplifier. Transistor Q603 is biased at base terminal 631 as a constant current source for transistors Q601 and Q602 which are themselves identically biased as class A amplifiers by the networks connected to the base terminals 611 and 621 of Q601 and Q602, respectively. For example, resistors R614 and R615 form a voltage divider which applies a DC bias voltage to the base terminal 611 of transistor Q601. This bias voltage at the base terminal 611 is stabilized by capacitor C616. Similarly, the network comprised of resistors R624 and R625 and capacitor C626 provide a stabilized DC bias voltage to the base terminal 621 of transistor Q602. Thus biased, constant and equal quiescent DC bias currents flow in the collector-emitter circuits of transistors Q601 and Q602. Resistor R613 is the load resistor for Q601 and an identical value resistor R623 forms the load resistor for Q602. An AC signal applied to the base terminal 631 of Q603, from the input 655 through capacitor C636 and resistor R637, is amplified by the operation of Q603 and Q601 with the output taken from the collector 610 of Q601. The amount of amplification produced in Q601 is proportional to the collector current flowing in the load resistor R613. Thus, by varying the DC quiescent current value flowing in Q601 and R613, the gain of the stage can be controlled.

In FIG. 6a the gain of Q601 is controlled by varying the DC bias voltage present at the base terminal 621 of Q602 which controls the partitioning of the quiescent DC current flowing in the collector-emitter paths of Q601 and Q602. As the base 621 voltage is increased, Q602 conducts more of the current shared by Q601 and Q602 while Q601 conducts less of the shared current, and the signal amplitude developed across load resistor R613 decreases. The opposite result occurs if the voltage at the base 621 of Q602 is decreased. This DC bias voltage at base 621 is responsive to the charge on capacitor C626 which is increased via bias rectifier diode D605 whenever the AGC 600 output 660 voltage exceeds a predetermined reference level. This reference level is set by the amount of the base-emitter voltage drop of transistor Q602, in series with the cathode-to-anode voltage drop of bias rectifier diode D605, referenced to the quiescent DC voltage bias of the junction of: collector 630 of Q603, emitter 612 of Q601, and emitter 622 of Q602. Electrical charge is thus added to capacitor C626 whenever the positive peak value of the signal voltage present at output terminal 660 exceeds the DC voltage at the base 621 plus the diode voltage drop of bias rectifier diode D605. This charge is added relatively quickly because the time constant comprised of R627×C626 is short—on the order of 50 milliseconds in this embodiment. However, the charge on capacitor C626 takes much longer to return to ground because the discharge time constant through R624 and R625 is approximately ten to 40 times as long. The overall gain of the AGC 600 section is therefore decreased rapidly on strong signals and returns to normal much more slowly. The purpose of output amplifier U604 is to set the operating point of the reference output signal swing and supply much of the overall gain of the AGC 600 section. The operating point is set by the DC bias voltage at the positive terminal of output amplifier U604 by the voltage divider comprised of resistor R644 and resistor R645. Specific numerical values for the DC bias voltages will depend on the particular signal characteristics specified by the designer in a particular application. In general, the DC bias voltage at the collector 630 of Q603 will be set to one-half the DC supply voltage. In this particular embodiment, the DC supply voltage is +5.0 volts as shown in FIG. 6a.

Figure 6B:
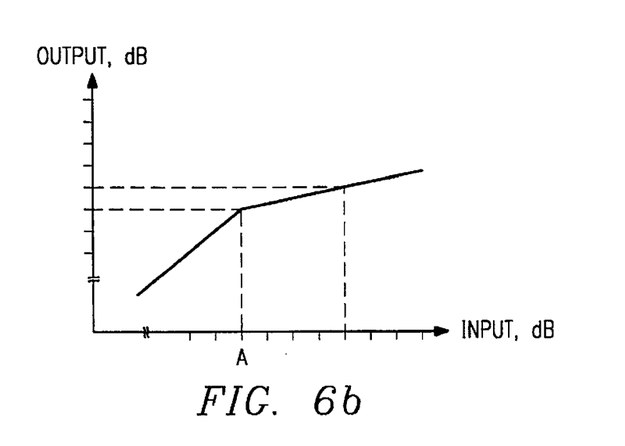

FIG. 6b illustrates the AGC 600 input-output characteristic whereby for input signal levels exceeding a predetermined level indicated by control point A along the ordinate, the gain is reduced by a factor of approximately four-to-one. FIG. 6b, for the sake of emphasis, only shows the gain characteristic in the region of the control threshold; above and below the knee of the curve, corresponding approximately to the control point A, the gain shown by the slope of the curve is relatively constant. For example, in the preferred embodiment, the input signal level control point A, where the gain characteristic begins to change with signal level, is approximately −46 dBM for the microphone AGC 505 (FIG. 5a) and −14 dBM for the line receive (Rx) AGC 510 (FIG. 5a). These signal levels correspond roughly to 4.0 millivolts and 156 millivolts, respectively. These signal level numerical values are provided for illustration only and may be different values as the designer specifies in a particular application.

Figure 7B:
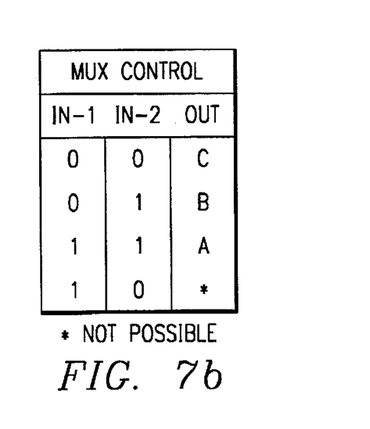

FIG. 7a illustrates a functional block diagram model of the signal processing provided by the transmit level control (TxLC) 700 program function in the digital processor 520 shown in FIG. 5b. The input paths 527 and 561, and the output path 537 are referenced the same in both FIG. 7a and FIG. 5b for convenience. FIG. 7b, the multiplexer truth table and FIG. 7c the control characteristic, provides information about the operation of the TxLC 700 of PIG. 7a. The apparatus of FIG. 7a, while it illustrates the TxLC 700 of the preferred embodiment, is not the only implementation possible. Other schemes may be used to achieve the desired attenuation response in a particular application.

The TxLC 700 in FIG. 7(a) attenuates the Tx signal 527 obtained from the output of the acoustic echo filter 533 (FIG. 5b) responsive to the power level of the receive Rx signal 561 that exceeds the reference power level 733. An algorithm is employed in signal converter 732 to convert the voltage level of the Rx signal 561 to a power level prior to the comparison of the Rx signal power 734 with the reference power level 733 in comparator 735. In the preferred embodiment, the algorithm employed in the signal converter 732 is expressed as:

$$s(k)=a \cdot X^2(k)+(1-s)a(k-1)$$

where:

X(k) is the incoming receive voltage signal at time k;

a is a constant; and s(k) is the power level of the incoming receive voltage signal at time k.

When s(k) at 734 exceeds the reference power level 733 the comparator output 736 changes state to an active high which in turn simultaneously enables first timer 713. and second timer 723. When the timers 713 and 723 become enabled their outputs immediately change state to active high signals at the base 712 of transistor Q710, and the base 722 of transistor Q720, thus turning on transistors Q710 and Q720, respectively. Transistors Q710 and Q720 are switched to the on state together by the simultaneous enabling of the first 713 and second 723 timers.

Leaving transistors Q710 and Q720 turned on for a moment, consider the multiplexer 706 which controls the attenuation applied to the incoming transmit signal 527. The incoming transmit signal 527 can follow one of three paths in the preferred embodiment as determined by the position of the switch arm 705 within the multiplexer 706. If the switch arm 705 is in contact with terminal A in multiplexer 706, the incoming signal on path 702 passes to the output without attenuation via terminal D and path 537. If the switch arm 705 is in contact with terminal B within multiplexer 706, the incoming signal passes through attenuator 703, is attenuated by 3 dB, and passes through the output terminal D and path 537. If the switch arm 705 is in contact with terminal C within multiplexer 706, the incoming signal passes through attenuator 704, is attenuated by 6 dB, and passes through the output terminal D and path 537. Which contact A, B, or C of multiplexer 706 is connected to switch arm 705 is determined by the signal conditions summarized in the truth table shown in FIG. 7b.

The truth table of FIG. 7b relates the amount of attenuation of the incoming signal to the control signal conditions at inputs IN-1 (708) and IN-2 (709). If both inputs IN-1 and IN-2 are at a logic low, the attenuation of the incoming signal is 6 dB because the switch arm 705 is connected to terminal C in the multiplexer 706. If input IN-1 (708) is at a logic low and input IN-2 (709) is at a logic high, the attenuation of the incoming signal is 3 dB because the switch arm 705 is connected to terminal B in the multiplexer 706. Finally, if both inputs IN-1 (708) and IN-2 (709) are at a logic high, no attenuation is applied to the incoming signal at terminal A of multiplexer 706.

Figure 7C:
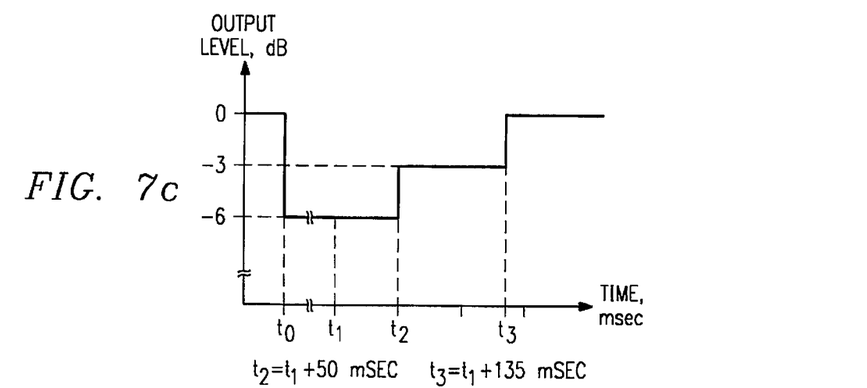

Referring now to the TxLC control characteristic in FIG. 7c, the effect of the first timer 713 and second timer 723 is shown. When the power level of the Rx signal at path 561 exceeds the threshold, an immediate 6 dB of attenuation is applied to the Tx signal at time $t_o$ at path 537 due to the simultaneous enabling of first timer 713 and second timer 723 and the resulting low logic levels applied to IN-1 (708) and IN-2 (709). The 6 dB attenuation provided by attenuator 704 remains applied until the input signal drops below the predetermined power threshold at time $t_1$ whereupon timers 713 and 723 begin timing on the negative-going edge of the output signal 736 of comparator 735. When the first timer 713 times out at the end of approximately 50 milliseconds at time $t_2$ transistor Q710 turns off and a logic level high signal is then applied to input IN-1 (708) of multiplexer 706 which transfers the switch arm 705 from terminal C to terminal B of multiplexer 706. Thus, the amount of attenuation applied to the incoming signal on path 527 is reduced to 3 dB approximately 50 milliseconds after the Rx signal power level dropped below the power reference level at time $t^2$. Likewise, the 3 dB attenuation provided by attenuator 703 remains applied until second timer 723 times out at time $t_3$ approximately 85 milliseconds after timer 713 timed out whereupon transistor Q720 turns off and a logic level high signal is then applied to input IN-2 (709) of multiplexer 706 which in turn transfers switch arm 705 from terminal B to terminal A of multiplexer 706. Thus, the amount of attenuation to the incoming signal on path 527 is reduced to zero approximately 135 milliseconds after the Rx signal power level dropped below the reference power level. In this way a fast-attack/slow-release attenuation action is approximated. The attenuation amounts and the timer durations may vary depending on the application. In the case of the full duplex speaker phone embodying the present invention, the values described were determined empirically to provide the degree of signal level control needed in the particular embodiment.

The invention described herein may be applied to other combined telephone and audio system devices where full duplex operation is intended and where the microphone and loudspeaker are not positioned in a handset held against the user's vocal and hearing apparatus. One example is a hands-free telephone as used in a cellular mobile radiotelephone. The microphone and loudspeaker may be separate structures in the mobile vehicle or transport housing or incorporated into another audio system provided for another purpose such as an automobile radio or the like. In this embodiment, signals from the loudspeaker are coupled into the microphone giving rise to acoustic echoes just as in the speakerphone embodiment described in detail above. The electrical echoes can also occur just as in the speakerphone because the same structures are involved.

Another example of a suitable embodiment is a videophone or picturephone system providing video information as a adjunct to a telephone communication. The audio system is the same as the speakerphone discussed above and would embody the invention as described and claimed herein.

It is understood that variations may be made in the present invention without departing from the spirit and scope of the invention. For example, alternate configurations for the soft-limiting characteristics of the analog gain controls are well known in the art and implementations with operational amplifiers or using other circuit techniques instead of discrete transistors are possible. Furthermore, these stages could alternatively be implemented to maintain the signal levels within more narrowly defined ranges or could provide increased gain for weak signals as well as limit the gain for excessive signals. Variations in the digital section are contemplated as well as including implementing the two AFIR filters, the transmit level control, and the system control functions with a single DSP part.

Further modifications are noted as follows:

1. The receive AGC 510 could be placed between A/D converter 508 and digital processor 520 and implemented using a DSP processor.
2. The mic AGC 505 could be placed between the A/D converter 507 and digital processor 520 and implemented using a DSP processor.
3. Transmit level control 700 may be implemented with more than two timers with the total amount of attenuation divided into more or less equal steps.
4. Modifications to the transmit level control 700 may also include different attenuator and timer values than the ones described in the illustrative embodiment. For example, the timing value for selecting the first attenuation value may be selected from the range of 10 milliseconds to 250 milliseconds and the timing value for selecting the second attenuation value may be one to ten times the timing value for the first attenuation value.

Although one illustrative embodiment of the invention has been shown and described in detail, a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for suppressing echoes in a speakerphone comprising the steps of:
   (a) inputting a transmit signal and a receive signal;
   (b) limiting the amplification of said transmit or said receive signal respectively, in an analog amplifier, when the amplitude of said transmit signal or said receive signal exceeds a predetermined level in said analog amplifier;
   (c) digitally filtering said echoes from said transmit and receive signals;
   (d) comparing the signal power of said receive signal with a reference power; and
   (e) attenuating said transmit signal when said signal power of said receive signal exceeds said reference power.

2. The method of claim 1 wherein said step of limiting the amplification of said transmit signal further comprises:
   (a) amplifying said transmit signal in a first amplifier, said first amplifier having a variable gain and an output coupled to a second amplifier having a fixed gain;

(b) detecting a peak value of said transmit signal at an output of said second amplifier; and (c) reducing said variable gain of said first amplifier responsive to said peak value when said peak value of said transmit signal exceeds said predetermined level.

3. The method of claim 2 wherein said step of detecting comprises charging a capacitor through a rectifier coupled to said output of said second amplifier.

4. The method of claim 1 wherein said step of limiting the amplification of said receive signal further comprises:

(a) amplifying said receive signal in a third amplifier, said third amplifier having a variable gain and an output coupled to a fourth amplifier having a fixed gain;

(b) detecting a peak value of said receive at an output of said forth amplifier; and (c) reducing said variable gain of said third amplifier responsive to said peak value when said peak value of receive signal exceeds said predetermined level.

5. The method of claim 4 wherein said step of detecting comprises charging a capacitor through a rectifier coupled to said output of said fourth amplifier.

6. The method of claim 1 wherein the step of digitally filtering said echoes comprises:

(a) converting said limited transmit and receive signals from analog to digital form thereby producing respectively, converted transmit signals and converted receive signals;

(b) canceling first echo signals in said transmit signal;

(c) canceling second echo signals in said receive signal; and (d) converting said digitally filtered transmit signal and said digitally filtered receive signal from digital to analog form.

7. The method of claim 6 wherein said step of canceling first echo signals comprises;

(a) generating a first correction signal from a corrected receive signal and a corrected transmit signal; and (b) summing said first correction signal and said converted transmit signal to produce said corrected transmit signal.

8. The method of claim 7 wherein said step of generating comprises:

(a) calculating acoustic path delay line weighting coefficients;

(b) shifting said converted transmit signal into an acoustic path delay line;

(c) multiplying the contents of said acoustic path delay line by said weighting coefficients to produce said first correction signal;

wherein said calculating, shifting, and said multiplying steps occur synchronously.

9. The method of claim 8 wherein said calculating step comprises individually summing a previous acoustic path coefficient with a product of said digitally filtered transmit signal, a delayed converted transmit signal, and a first predetermined convergence factor.

10. The method of claim 6 wherein said step of canceling second echo signals comprises:

(a) generating a second correction signal from said corrected transmit signal and said corrected receive signal; and (b) summing said second correction signal and said converted receive signal to produce said corrected receive signal.

11. The method of claim 10 wherein said step of generating comprises:

(a) calculating electric path delay line weighting coefficients;

(b) shifting said converted receive signal into an electric path delay line;

(c) multiplying the contents of said electric path delay line by said weighting coefficients to produce said second correction signal;

wherein said calculating, shifting, and multiplying steps occur synchronously.

12. The method of claim 11 wherein said calculating step comprises individually summing a previous electric path coefficient with a product of said digitally filtered receive signal, a delayed converted receive signal, and a second predetermined convergence factor.

13. The method of claim 1 wherein said step of comparing comprises:

(a) determining an equivalent power of said receive signal; and (b) comparing said equivalent power of said receive signal with said reference power.

14. The method of claim 13 wherein said step of attenuating comprises:

(a) generating a plurality of timed control signals responsive to said comparing;

(b) selecting an attenuation value responsive to said plurality of timed control signals; and (c) switching said attenuation value into effect upon said transmit signal.

15. The method of claim 14 wherein said step of switching comprises applying said timed control signals in sequence to a multiplexer.

16. Apparatus for suppressing echoes in a speakerphone comprising:

(a) means for inputting a transmit signal and a receive signal;

(b) means for limiting the amplification of said transmit or said receive signal respectively, in an analog amplifier, when the amplitude of said transmit signal or said receive signal exceeds a predetermined level in said analog amplifier;

(c) means for digitally filtering said echoes from said transmit and receive signals;

(d) means for comparing the signal power of said receive signal with a reference power; and (e) means for attenuating said transmit signal when said signal power of said receive signal exceeds said reference power.

17. The apparatus of claim 16 wherein said means for limiting the amplification of said transmit signal further comprises:

(a) first amplifier means for amplifying said transmit signal, said first amplifier means having a variable gain and an output coupled to a second amplifier means having a fixed gain;

(b) means for detecting a peak value of said transmit signal at an output of said second amplifier means; and (c) means for reducing said variable gain of said first amplifier means responsive to said peak value when said peak value of said transmit signal exceeds said predetermined level.

18. The apparatus of claim 17 wherein said means for detecting comprises a capacitor charging through a rectifier coupled to said output of said second amplifier means.

19. The apparatus of claim 16 wherein said means for limiting the amplification of said receive signal further comprises:

(a) third amplifier means for amplifying said receive signal, said third amplifier means having a variable gain and an output coupled to a fourth amplifier means having a fixed gain;

(b) means for detecting a peak value of said receive signal at an output of said fourth amplifier means; and (c) means for reducing variable gain of said third amplifier means responsive to said peak value when said peak value said receive signal exceeds said predetermined level.

20. The apparatus of claim 19 wherein said means for detecting comprises a capacitor charging through a rectifier coupled to said output of said fourth amplifier means.

21. The apparatus of claim 16 wherein said means for digitally filtering said echoes comprises:

(a) means for converting said limited transmit and receive signals from analog to digital form thereby producing, respectively, converted transmit signals and converted receive signals;

(b) means for canceling first echo signals in said transmit signal;

(c) means for canceling second echo signals in said receive signal;

(d) means for converting said digitally filtered transmit signal and said digitally filtered receive signal from digital to analog form.

22. The apparatus of claim 21 wherein said means for canceling first echo signals comprises;

(a) means for generating a first correction signal from a corrected receive signal and a corrected transmit signal; and (b) means for summing said first correction signal and said converted transmit signal to produce a corrected transmit signal.

23. The apparatus of claim 22 wherein said means for generating comprises:

(a) means for calculating acoustic path delay line weighting coefficients;

(b) means for shifting said converted transmit signal into said acoustic path delay line;

(c) means for multiplying the contents of said acoustic path delay line by said weighting coefficients to produce said first correction signal;

wherein said calculating means, said shifting means, and said multiplying means operate synchronously.

24. The apparatus of claim 23 wherein said calculating means comprises means for individually summing a previous acoustic path coefficient with a product of said digitally filtered transmit signal, a delayed converted transmit signal, and a first predetermined convergence factor.

25. The apparatus of claim 21 wherein said means for canceling second echo signals comprises:

(a) means for generating a second correction signal from said corrected transmit signal and said corrected receive signal; and (b) means for summing said second correction signal and said converted receive signal to produce said corrected receive signal.

26. The apparatus of claim 25 wherein said means for generating comprises:

(a) means for calculating electric path delay line weighting coefficients;

(b) means for shifting said converted receive signal into said electric path delay line;

(c) means for multiplying the contents of said electric path delay line by said weighting coefficients to produce said second correction signal;

wherein said calculating means, said shifting means, and said multiplying means operate synchronously.

27. The apparatus of claim 26 wherein said calculating means comprises means for individually summing a previous electric path coefficient with a product of said digitally filtered receive signal, a delayed converted receive signal, and a second predetermined convergence factor.

28. The apparatus of claim 16 wherein said means for comparing comprises:

(a) means for determining an equivalent power of said receive signal; and (b) means for comparing said equivalent power of said receive signal with said reference power.

29. The apparatus of claim 28 wherein said means for attenuating comprises:

(a) means for generating a plurality of timed control signals responsive to said means for comparing;

(b) means for selecting an attenuation value responsive to said plurality of time control signals; and (c) means for switching said attenuation value into effect upon said transmit signal.

30. The apparatus of claim 29 wherein said means for switching comprises means for applying said timed control signals in sequence to a multiplexer.

* * * * *